United States Patent
Zhang et al.

(10) Patent No.: US 7,492,962 B2
(45) Date of Patent: Feb. 17, 2009

(54) SYSTEM OR METHOD FOR ENHANCING AN IMAGE

(75) Inventors: Yan Zhang, Kokomo, IN (US); William A. Bauson, Kokomo, IN (US); Robert A. Perisho, Jr., Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 694 days.

(21) Appl. No.: 11/212,052

(22) Filed: Aug. 25, 2005

(65) Prior Publication Data

US 2007/0047833 A1   Mar. 1, 2007

(51) Int. Cl.
G06K 9/40   (2006.01)
(52) U.S. Cl. .................. 382/274; 382/275; 382/284; 382/294; 358/3.26; 358/3.27
(58) Field of Classification Search .......... 382/274, 382/275, 284, 294; 358/3.26, 3.27
See application file for complete search history.

(56) References Cited

U.S. PATENT DOCUMENTS

| | | | |
|---|---|---|---|
| 5,644,662 A | | 7/1997 | Vuylsteke |
| 5,886,353 A | * | 3/1999 | Spivey et al. .......... 250/370.09 |
| 7,130,486 B2 | * | 10/2006 | Eggers et al. .............. 382/274 |
| 7,307,793 B2 | * | 12/2007 | Ottney et al. ............... 359/634 |
| 7,315,241 B1 | * | 1/2008 | Daily et al. ................ 340/525 |
| 2004/0042676 A1 | | 3/2004 | Srinivasa |
| 2004/0145674 A1 | | 7/2004 | Hoppe et al. |

OTHER PUBLICATIONS

European Patent Office Communication for Application No. 06076559.1-2218, dated Sep. 26, 2007, 8 pages.
EP Search Report dated Oct. 10, 2006.

* cited by examiner

Primary Examiner—Yosef Kassa
(74) Attorney, Agent, or Firm—Jimmy L. Funke

(57) ABSTRACT

A system and method for enhancing the contrast within an image. An enhanced image can be generated in a real-time or substantially real-time manner from an initial image. A low-contrast image is enhanced, including the visibility of text within the low-contrast image. A logarithm transform method is used to enhance the overall contrast and visibility within the image. A power transform method is used to enhance the visibility and contrast of written text, symbols and other forms of signs within the enhanced image.

22 Claims, 13 Drawing Sheets

US 7,492,962 B2

SYSTEM OR METHOD FOR ENHANCING AN IMAGE

BACKGROUND

The disclosure relates generally to systems and methods for enhancing images (collectively the "system"). More specifically, the disclosure relates to systems for enhancing the contrast and visibility within an image.

There are many contexts in which human beings and/or machines are impeded by low-contrast images. The ability of a human being to safely operate a vehicle or other type of machine can be substantially impeded by a relatively dark environment. Night time driving is substantially more difficult and dangerous than day time driving. It is estimated that 28% of driving occurs at night; however, it is estimated that night time driving is responsible for over 62% of pedestrian fatalities. Standard headlights on a "low beam" typically illuminate approximately 60 meters ahead of the vehicle. At a speed of 60 miles per hour, a driver has approximately three seconds to react to a visible obstacle. Further complicating the visibility of the driver is the glare of headlights from one or more vehicles traveling in one or more directions. The scope of what is visible also complicates driver assistance with respect to vision. A technology that improves the visibility of letters on a street sign may not be satisfactory with respect to the visibility of objects on the road, and vice versa.

There are many other contexts in which human beings are impeded by poor visibility in dark (e.g. low contrast) environments. Whether the task is navigation, the operation of equipment, or simply observation, human beings are adversely impacted by an inability to observe "contrast" in his or her surroundings. Difficulties associated with low contrast environments are not limited to human beings. Sensors and the various machines that rely on those sensors can also be negatively impacted by relatively dark environments. There are numerous examples in the known art where automated processing is performed in response to information obtained from various vision sensors/imagers. Security applications, industrial robots, automated vehicles, military devices, and other applications involving automated machines utilizing images captured from various vision sensors are often impeded by low contrast/poor visibility environments. Further complicating the processing of low-contrast images are the difficulties associated with enhancing a low-contrast image while simultaneously improving the visibility of text on a reflective street sign within the enhanced image.

BRIEF DESCRIPTION OF THE DRAWINGS

The present disclosure will be more fully understood upon reading the following detailed description in conjunction with the accompanying drawings.

DETAILED DESCRIPTION

The disclosure relates generally to systems and methods for enhancing images (collectively "enhancement systems" or simply the "system"). More specifically, the invention relates to systems for enhancing the contrast and visibility within an image. The system can be used in a wide variety of different contexts and operating environments. The system can be embodied in a wide variety of different components and architectures.

The system can be used to facilitate, support, or otherwise assist in the operation of:

a vehicle by a human being;

an automated vehicle guided by an image captured from a sensor;

night vision goggles, cameras, and other "night vision" devices;

security cameras;

motion detectors;

vehicle navigation and operation applications;

camping equipment;

security applications; and any other application or function in which an enhanced image is useful.

A variety of ancillary devices can be used to support the functionality of the system. For example, in the context of a system providing "night vision" to the driver of a vehicle, it might be desirable to use a CMOS camera along with an infrared illuminator to achieve high night time visibility as far as 150 m ahead of the vehicle. Different embodiments of the system can use different sensors for capturing images. Some embodiments of the system may use multiple sensors to capture multiple images in a simultaneous or substantially simultaneous manner. Some embodiments of the system will incorporate illumination assistance devices such as an infrared illuminator, while other embodiments will not.

Figure 1:
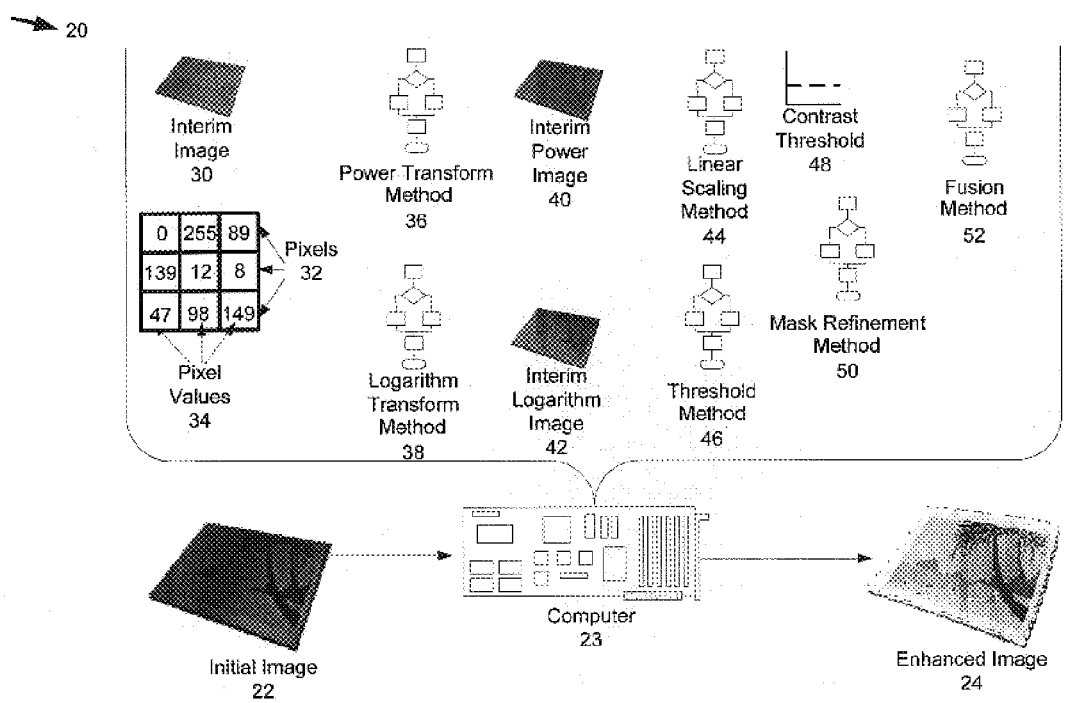
FIG. 1 is a block diagram according to an embodiment illustrating an example of different elements that can influence the processing performed by a computer to create an enhanced image from an initial image.

FIG. 1 is a block diagram illustrating an example of a system 20. The system 20 is used to enhance images (e.g. create an enhanced image 24 from an initial image 22). An initial image 22 can also be referred to as a raw image, a non-enhanced image, an un-enhanced image, or an image directly captured from a camera. The initial image 22 is the image that would need to be relied upon if the system 20 were not present to enhance the contrast within the initial image 22.

In a night time driving embodiment of the system 20, the initial image 22 is the driver's unaided view of the road as captured by a camera or other form of a vision sensor in or on the vehicle. In many embodiments, the initial image 22 will be a digital image captured by a sensor in a real-time or substantially real-time manner. In other embodiments, the initial image 22 can be in an analog format, subject to a conversion process in which a digital version of the initial image 22 is created for use by the system 20.

The system 20 typically breaks down the initial image 22 into pixel values associated with individual pixels for processing by a computer 23. A computer 23 is any device or combination of devices capable of implementing the processing requirements of the system 20 to create enhanced images 24 from initial images 22. In a night time driving embodiment of the system 20, the computer 23 will typically be embedded into the vehicle. In a night vision goggle embodiment of the system 20, the computer 23 could be located within the goggles themselves, or the computer 23 could be configured to communicate with the goggles through a wire or some type of wireless connection. With respect to embodiments of the system 20 that involve automated devices utilizing sensor images, the computer 23 could be located within the sensor, within the automated device, or at some third location, depending on the desired operating environment and processing goals of the system 20.

In many embodiments of the system 20, the system 20 is configured to create enhanced images 24 from initial images 22 in a real-time or substantially real-time manner. In other embodiments, the speed of the system 20 is not as important, and processing can be performed in a batch mode. An enhanced image 24 is an image enhanced by the operations of the computer 23 from the initial image 22. The system 20 can be used to enhance images in one or more ways. Certain aspects or portions of the image (e.g. pixels) can be brightened to enhance the contrast and visibility within the image. Certain aspects or portions of the image (e.g. pixels) can be darkened to reduce the glare and saturation within the image. The enhanced image 24 is typically a digital image, although in certain embodiments it could be an analog image. The format of the enhanced image 24 and other attributes of the enhanced image 24 can be influenced by the ways in which the enhanced image 24 is to be used by the application invoking the functionality of the system 20.

The system 20 enhances the initial image 22 by performing various mathematical and/or statistical operations on pixel values 34 relating to the pixels 32 in the initial image 22. The modified pixel values 34 can be said to constitute an interim image 30 at various stages of system 20 processing before the system 20 has completed the enhancement process. However, the system 20 will not actually create an interim image 30 in the process of enhancing the image. Instead, the term interim image 30 will more typically refer to a set of pixel values 34 that are in the process of being modified by the system 20. Different embodiments of the system 20 can involve a wide variety of different interim image processing steps. Interim images 30 can also be referred to as "work in process" images 30.

Initial images 22, interim images 30, and enhanced images 24 processed by the system 20 can be divided up into individual pixels 32. The number of pixels 32 in an image determines the potential quality and level of detail that the image can convey. For example, an image that is 1000 pixels high and 800 pixels wide has greater resolution than an image that is only 500 pixels high and 400 pixels wide. The sensor used to capture the initial image 22 will typically be the limiting factor with respect to the number of pixels within the initial image 22, and ultimately, the number of pixels within the enhanced image 24. For example, the type of camera used to capture the initial image 22 can determine whether the initial image 22 will have a resolution of VGA (or higher).

Each pixel 32 can be associated with a pixel value 34. For an 8-bit grayscale image, a typical pixel value 34 is an integer between 0 and 255, with 0 representing absolute darkness and 255 representing the highest measure of brightness. Different ranges of pixel values 34 can be incorporated into different embodiments of the system 20, such as, for example a color image. In application, a grayscale image may be used to compute enhancements for each channel of a color image. In another application, enhancements for each channel of a color image may be computed.

Figure 2:
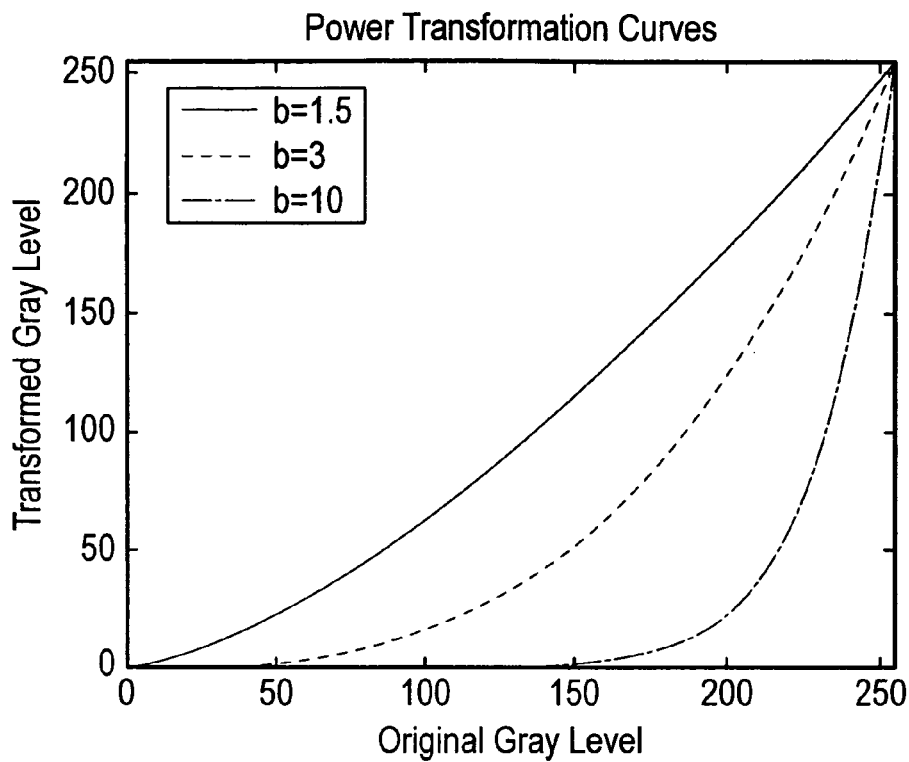
FIG. 2 is a graph including a power transform curve.

A power transform method 36 is often used by the system 20 in parallel with a logarithm transform method 38. The power transform method 36 is typically effective for enhancing portions of the initial image 22 that the logarithm transform method 38 is not adept at enhancing. An example of a power transform method is provided as Equation 1 below and illustrated in FIG. 2.

$$I_{power} = cI^b \quad (1)$$

$I_{power}$ represents the transformed pixel value 34 for a particular pixel 32. I represents the initial pixel value 34 for the particular pixel 32. The variables c and b are predefined parameters selected by the implementers of the system 20 to suit the particular application of the particular embodiment of the system 20. The variable b will often be set at a number larger than 1. The variable c will often be a number between 1 and 4.

Figure 3:
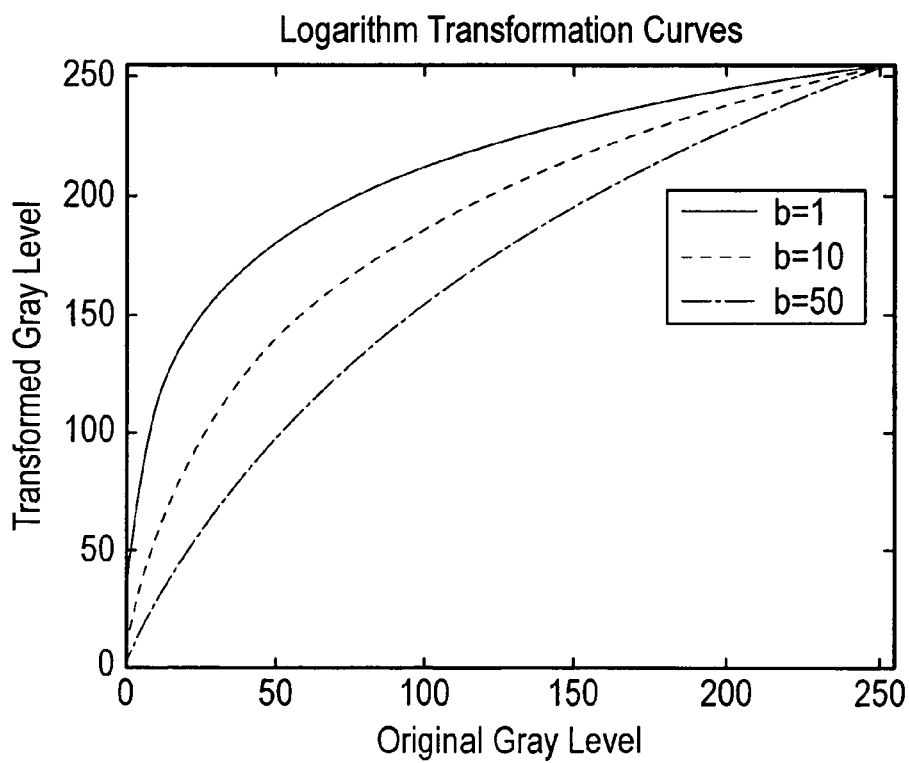
FIG. 3 is a graph including a logarithm transformation curve.

A logarithm transform method 38 is typically used to enhance the majority of the initial image 22. The power transform method 36 is used to compensate for weaknesses in the logarithm transform method 38 that involve saturating and/or conversely suppressing image contrast with respect to characters displayed on a flat reflective surface such as a street sign. An example of a logarithm transform method 38 is provided in Equation 2 below and illustrated in FIG. 3.

$$I_{log} = c \log(I+b) \quad (2)$$

I represents the initial pixel value 34 for a pixel 32 in the initial image 22. $I_{log}$ represents the pixel value 34 for a pixel 32 after being subject to the logarithm transform method 38. The variables b and c are typically predefined parameters that have been set by the implementer of the system 20 to generate results suitable in a particular environment for a particular embodiment of the system 20. In a night vision embodiment for a vehicle, the variable c will often be set a value between 1 and 4 and the variable b will often be set a value larger than 1.

An interim power image 40 is a collection of pixels 32 with pixel values 34 that have been modified by the power transform method 36. The interim power image 40 can also be referred to as a power image 40. An interim log image 42 is a collection of pixels 32 with pixel values 34 that have been modified by the logarithm transform method 38. The interim log image 42 can also be referred to as a log image 42. A linear scaling method 44 can be applied to both power images 40 and log images 42 so that all pixel values 34 are linearly distributed in the range of possible pixel values 34, a range that will often start at 0 and end at 255. A threshold method 46 is a process by which pixel values 34 are modified on the basis of whether the pixel 32 is currently associated with a pixel value 34 that exceeds a certain predefined contrast threshold 48. A contrast threshold 48 is a value used by the system 20 for the purposes of comparison with the contrast threshold 48.

Some embodiments of the system 20 will not include a contrast threshold 48. In some embodiments of the system 20, the contrast threshold 48 can be adjusted by the user of the system 20. For example, a driver utilizing the system 20 to provide "night vision" could be allowed to adjust the desired contrast in the image outputted by the system 20. Allowing the driver to modify the contrast threshold 48 could achieve such flexibility on the part of the system 20. The appropriate contrast threshold 48 for a particular embodiment of the system 20 can be influenced by the availability of an illumination assistance device, such as an infrared illuminator as well as the type of sensor or camera used to capture the initial image 22. In some embodiments of the system 20, different contrast thresholds 48 can be applied in different circumstances. For example, different contrast thresholds 48 could be applied to interior and exterior images.

Figure 4:
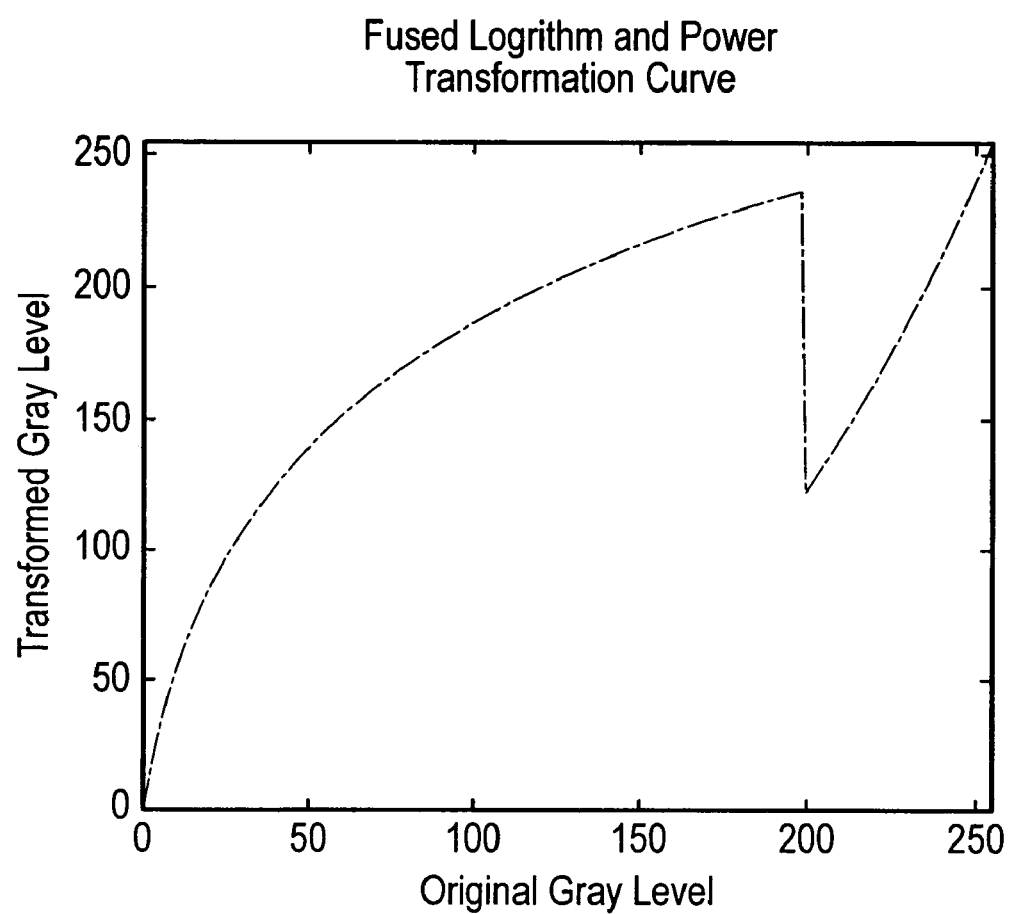
FIG. 4 is a graph including a fusion of the power transform and logarithm curves of FIGS. 2 and 3.

A mask refinement method 50 is typically used by the system 20 to prepare for the fusion or combining of the power image 40 with the log image 42. The mask refinement method 50 is typically performed on the power image 40, and not the log image 42. The mask refinement method 50 is described in greater detail below. An image fusion method 52 is used to combine the most useful parts of the power image 40 with the most useful parts of the log image 42, which is illustrated graphically in FIG. 4. The image fusion method 52 can also be referred to as a fusion method 52. The fusion method 52 is described in greater detail below.

Figure 5:
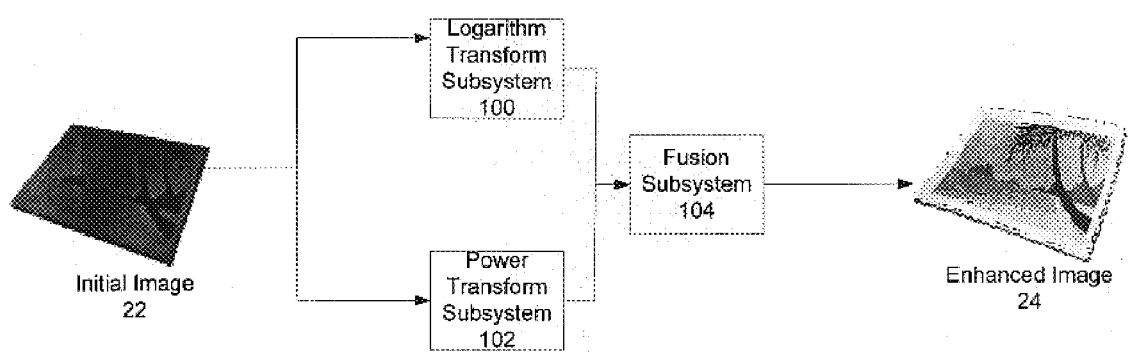
FIG. 5 is a block diagram illustrating an example of a subsystem-level view of the system.

FIG. 5 is a block diagram illustrating an example of a subsystem-level view of the system 20. As indicated in the diagram, copies of the initial image 22 can be processed independently and in parallel by a logarithm transform subsystem 100 and a power transform subsystem 102. The logarithm transform subsystem 100 performs the logarithm transform method 38 on a copy of the initial image 22 to create a log image 42. After the log image 42 is subjected to the linear scaling method 44, it can be sent to a fusion subsystem 104 as discussed below. The power transform subsystem 102 performs the power transform method 36 on a copy of the initial image 22 to create a power image 40. The power image 40 can then be subjected to the linear scaling method 44. The linearly scaled power image 40 can then be subjected to the threshold method 46 before being prepared for the fusion subsystem 104 by the invocation of the mask refinement method 50. The fusion subsystem 104 integrates the best portions of the power image 40 and the log image 42 to create the enhanced image 24. The processing of the subsystems identified above is described in greater detail below.

Figure 6:
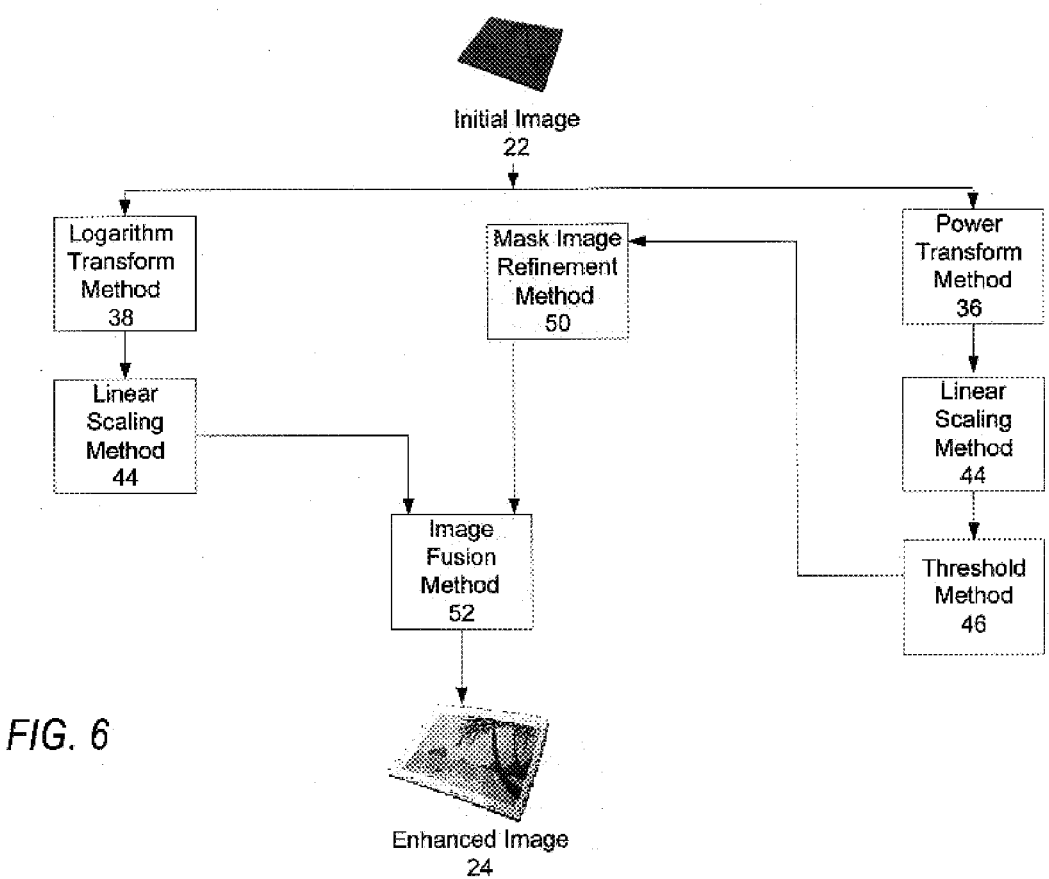
FIG. 6 is a flow chart diagram illustrating an example of a process-flow view of the system.

FIG. 6 provides a flow chart diagram illustrating a detailed example of a multi-threaded process flow of system 20 processing. The system 20 can perform a variety of processes that relate to the logarithm transform method 38. The logarithm transform method 38 is applied to the various pixel values 34 associated with the initial image 22. After Equation 2 is applied to the pixel values 34, the linear scaling method 44 is used to distribute the modified pixel values 34 linearly over the continuum of potential pixel values 34, typically a range from 0 through 255. After the log image 42 is linearly distributed, it is combined with the power image 40 by the fusion method 52 to create the enhanced image 24. The system 20 can perform a variety of processes that relate to the power transform method 36. The power transform method 36 is applied to the various pixel values 34 associated with the initial image 22. After Equation 1 is applied to the pixel values 34, the power image 40 is subjected to the linear scaling method 44 to distribute the modified pixel values 34 linearly over the continuum of potential pixel values 34, typically a range from 0 through 255. The threshold method 46 computes the contrast threshold 48 from the mean pixel value 34 and the standard deviation in the linearly distributed power image 40. Pixel values 34 less than the contrast threshold 48 are set to a value of 0. As a result, most of the power image 40 is made up of pixels 32 with a pixel value 34 of 0, but the portions of the power image 40 that relate to text, graphics, and other writings such as those found on a reflective street sign have pixel values 34 larger than 0. These portions of the power image 40 is typically superior to those in the log image 42.

The mask image refinement method 50 dilates the improved area in the power image 40 in an iterative manner, providing a mask image for the succeeding image fusion method 52. For each of the pixels 32 with a pixel value 34 larger than 0, the pixel value 34 for that pixel 32 is set to the corresponding pixel value 34 in the log image 42. This refinement method 50 reduces the boundary of the enhanced "sign" area within the power image 40. The mask image refinement method 50 can be applied iteratively, usually between 1 and 6 iterations. The iteration number is typically a predefined parameter that has been set by the implementer of the system 20 to generate results suitable in a particular environment for a particular embodiment of the system 20. In night driving embodiments, 3 iterations can be sufficient for acceptable results. The fusion method 52 combines the power image 40 and the log image 42 to create the enhanced image 24. For each pixel 32 in the power image 40 with a pixel value 34 greater than 0, the pixel value 34 in the power image 40 is used to set the applicable pixel 32 in the enhanced image 24. Otherwise, the pixel value 34 from the log image 42 is used to populate the applicable pixel 32 in the enhanced image 24.

Figure 7A:
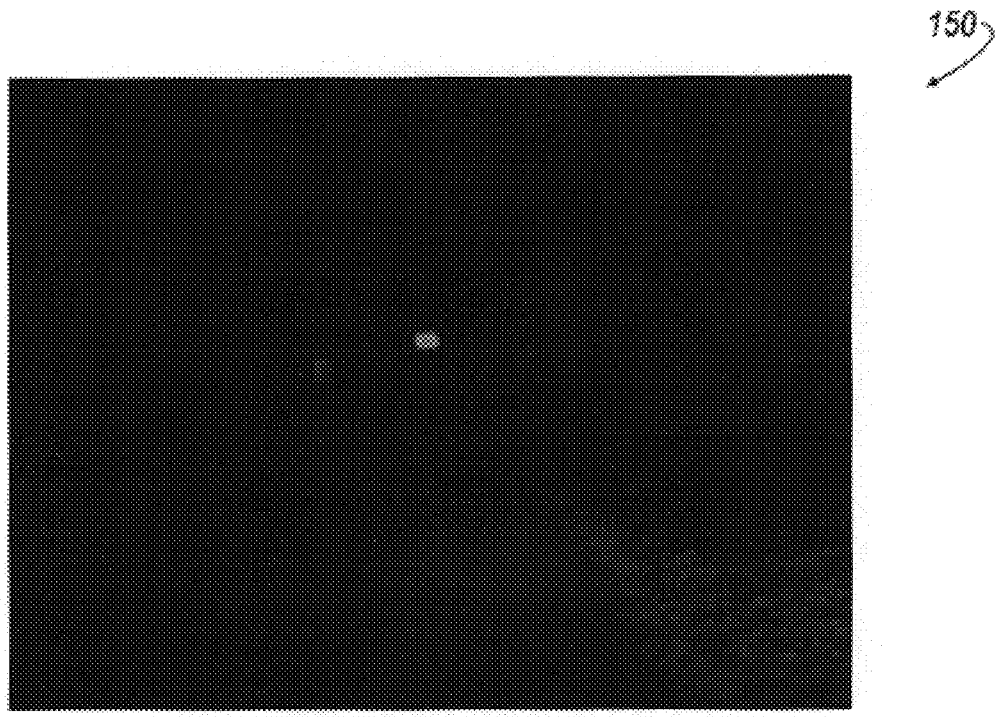
FIG. 7A is a raw image captured by a night vision imager.
Figure 7B:
FIG. 7B is a logarithm-transformed image according to the raw image of FIG. 7A.
Figure 7C:
FIG. 7C is a power-transformed image according to the raw image of FIG. 7A.
Figure 7D:
FIG. 7D is a fused image of the power-transformed and logarithm-transformed images of FIGS. 7B and 7C.

Referring to FIG. 7A, a raw image captured by a night vision imager is shown generally at 150, which shows a highly reflective road-sign including a symbol that is not discernable due to the low contrast of the road-sign. A logarithm-transformed image according to the raw image 150 is shown generally at 152 in FIG. 7B. As illustrated, the logarithm-transformed image 152 enhances the overall visibility of the raw image 150. A power-transformed image according to the raw image 150 is shown generally at 154 in FIG. 7C. As illustrated, the power-transformed image 154 enhances the visibility/readability and sharpness of the road-sign to successfully separate the sign from the scene. A fused image of the logarithm-transformed image 152 and the power-transformed image 154 is shown generally at 156 in FIG. 7D. As illustrated, the fused image 156 takes advantage of the desirable characteristics of both logarithm and power transforms 152, 154 to significantly improve the visibility of both the road-sign and the overall image quality.

Figure 8:
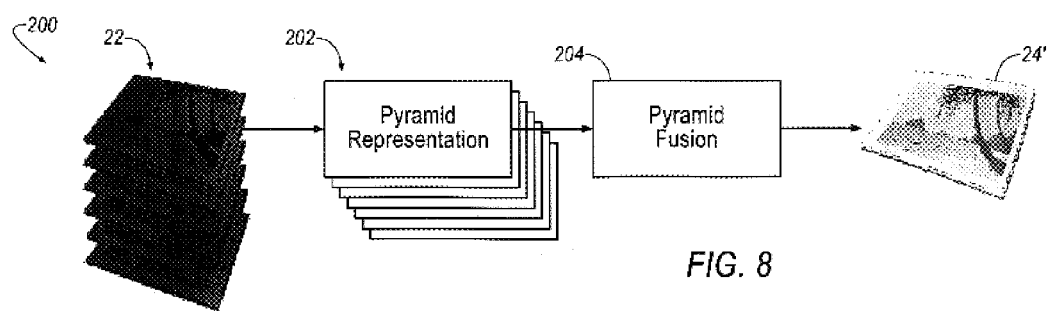
FIG. 8 is a block diagram of a Laplacian pyramid fusion based enhancement of a raw image.

Referring to FIG. 8, a further aspect of the disclosure relates to a Laplacian pyramid fusion based enhancement, which is shown generally at 200. The enhancement 200 prepares a pyramid representation of each initial image 22 at block 202 into a plurality of levels, then fuses the pyramid representations at block 204 for output as a fused image 24'. The initial image could be acquired from a multiple exposed camera, or from power and logarithm transformations. Accordingly, the enhancement 200 applies a multi-exposure image fusion approach to addressing the dynamic range limitation of standard cameras, and enhancing the night vision images. In principle, the fusion method applies to an arbitrary number of images. The fusing of two video frames including an under- and an over-exposed image is applied due to the real-time constraints on computation costs. This fusion strategy is motivated by the respective superiorities of over- and under-exposed images. On one hand, an under-exposed image has the desired characteristics of less saturated bright areas while an over-exposed image has the desired characteristics of higher visibility of dark areas. These characteristics of under- and over-exposed images for a nighttime scene may contain, for example, a pedestrian 100-meters away and an oncoming vehicle with headlights on. For such a scene, the under-exposed image has less saturated areas and better-contained headlight glare, but the overall visibility may be very low and the pedestrian may be hardly visible. At the same time, the over-exposed image may have an overall higher visibility of the pedestrian, but a severe headlight glare. The multi-exposure image fusion directed toward the enhancement 200 aims to take advantage of both under- and over-exposures to yield a composite image that covers the high dynamic range of the scene, and contains more accurate image content for both dark and bright areas simultaneously.

The Laplacian pyramid fusion based image enhancement 200 is reliable in its performance and potentials in real-time applications. Moreover, the Laplacian pyramid is a complete representation in the sense that the original, initial image 22 can be recovered exactly from the pyramid alone. The Laplacian pyramid fusion based enhancement 200 is a multi-resolution image representation 202, in which each level of the pyramid corresponds to a band-pass filter, and captures image details at a different scale.

Figure 9A:
FIG. 9A is a raw image captured by a night vision imager.
Figure 9B:
FIGS. 9B-9F illustrate different levels of a Laplacian pyramid representation of the raw image according to FIG. 9A.
Figure 9C:
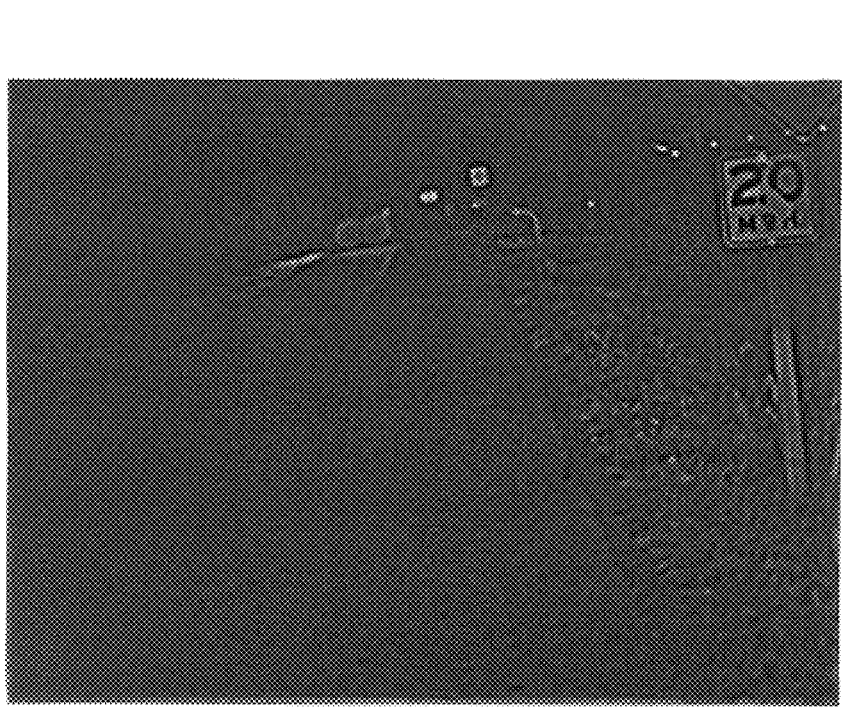
Figure 9D:
Figure 9E:
Figure 9F:

FIG. 9A shows a night vision raw image 250 and 5-levels of Laplacian pyramid representations at 252, 254, 256, 258, 260 in FIGS. 9B-9F, which are taken at block 202. The pyramid image representations 252-260 are rescaled in both the spatial and intensity domains for display. The true spatial resolutions of the pyramid images 252-260 are 640×480, 320×240, 160× 120, 80×60, and 40×30, respectively, for the five levels. The Level 1 image 252 has the finest image details while the Level 5 image 260 has the coarsest image details. The assumption is that the images to be fused at block 204 are aligned well; this assumption is fulfilled in this application where two consecutive video frames need to be fused, and the video acquisition speed is high enough so that the pixel shift between the two frames is negligible. Otherwise, an extra registration step can align the images prior to the fusion.

The fusion 204 is applied to image enhancement for night vision as follows. Given an under- and an over-exposed night vision image, a Laplacian pyramid is first built for each image. Next, the two pyramids are fused at block 204 according to a maximum selection rule in which the larger Laplacian amplitude represents a more salient/important image feature. Specifically, for each pixel at each level of the two pyramids, the larger amplitude is assigned to the same location in the composite pyramid. Finally, the fused image at block 204 is recovered from the composite pyramid as a fused image 24'. The characteristics of multi-resolution and salience measurement of the fusion approach ensures that the fused image 24' takes advantage of both under- and over-exposure at a variety of scales. Moreover, the fused image 24' can be further improved by the previously described embodiment above as shown in FIGS. 1-7D.

Figure 10:
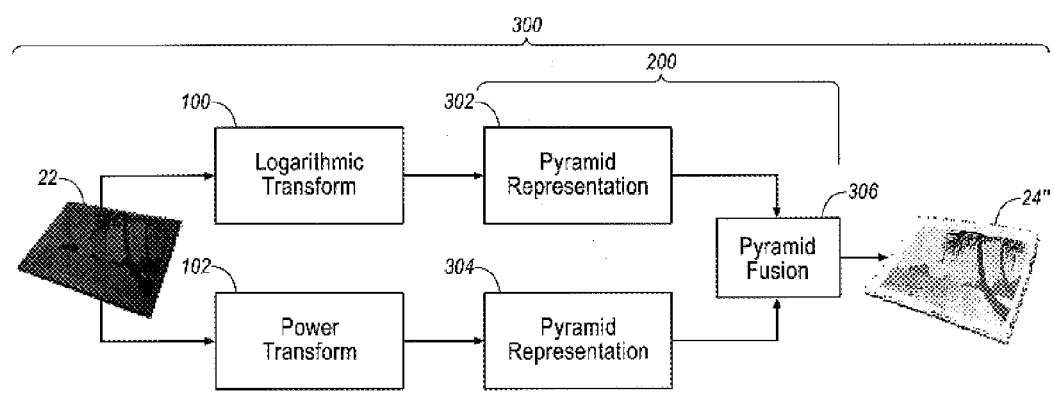
FIG. 10 is a block diagram illustrating an example of a process-flow view of the system including the Laplacian pyramid fusion based image enhancement.

Referring to FIG. 10, an enhanced image fusion system 300 utilizes elements shown in FIG. 5 to include the Laplacian pyramid enhancement 200. Starting from a single, raw night vision image 22, which is either from a single exposure or from the multi-exposure fusion, a logarithmic and a power transform subsystems 100, 102 are applied to the raw image 22 separately. A Laplacian pyramid is next built from each transformed image at 302 and 304. The number of pyramid levels (e.g. 5 levels as shown in FIGS. 9B-9F) may be, if desired, a user-specified parameter. The two pyramids 302, 304 are then fused into a composite pyramid at 306 according to a maximum selection rule in which the larger Laplacian amplitude represents a more salient image feature. A fused image 24" is then recovered from the composite pyramid.

The fused image 24" may contain more image details in both dark and headlamp areas of a raw image 22. Specifically, the dark areas including, for example, a pedestrian, may become more visible in the fused image 24" than those in the under-exposed image. Meanwhile, the bright areas including, for example, headlamps and road signs, are better contained and less saturated in the fused image than those in the over-exposed image. Similarly, the Laplacian pyramid fusion approach takes better advantage of logarithmic transform subsystem 100 and power transform subsystem 102.

Figure 11A:
FIG. 11A is a raw image captured by a night vision imager.
Figure 11B:
FIG. 11B is a logarithm-transformed image according to the raw image of FIG. 11A.
Figure 11C:
FIG. 11C is a power-transformed image according to the raw image of FIG. 11A.
Figure 11D:
FIG. 11D is a fused image of the logarithm-transformed and power-transformed images of FIGS. 11B and 11C using the Laplacian pyramid fusion based enhancement.

A set of captured images with the system 300 is shown generally in FIGS. 11A-11D. An original, raw night vision image 22 is shown in FIG. 11A. A logarithmic-transformed image (from block 302) of the raw image 22 is shown in FIG. 11B, which demonstrates that the visibility of dark areas in the original raw image has been improved significantly, but the bright areas have become more saturated. The power-transformed image (from block 304) of the raw image 22 is shown in FIG. 11C, where the contrast of bright areas in the original raw image 22 has been improved such that the areas are less saturated, but dark areas are even less visible than those in the original raw image 22. FIG. 11D demonstrates that the fused composite image (from block 306) has the advantages of both logarithmic- and power-transformed images while simultaneously suppressing their weaknesses.

Through the multi-level pyramid fusion system 300, the nonlinear transformation composes logarithmic and power transformations adaptively for each pixel at each scale. In summary, similar to the multi-exposure fusion, the characteristics of multi-resolution and salience measurement of the fusion approach ensure that the fused image 24" takes advantage of both logarithmic and power transformations.

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. An image enhancement system that is configured to create an enhanced image from an initial image, comprising:
    a power transform subsystem, said power transform subsystem providing for a power transform method for creating a power image from the initial image;
    a logarithm transform subsystem, said logarithm transform subsystem providing for a logarithm transform method for creating a log image from the initial image; and
    a fusion subsystem, said fusion subsystem providing for a fusion method for creating said enhanced image, wherein said enhanced image is influenced by said log image and said power image.

2. The system of claim 1, further comprising a linear scaling method, wherein said linear scaling method influences said log image and said power image.

3. The system of claim 1, further comprising a thresholding method, wherein said power image is influenced by said thresholding method.

4. The system of claim 1, further comprising a mask image refinement method, wherein said power image is influenced by said mask image refinement method.

5. The system of claim 1, wherein the initial image includes a sign image, wherein the power transform subsystem enhanced said sign image within said enhanced image.

6. The system of claim 1, wherein a plurality of initial images are captured by a CMOS camera at a rate of between about 10 frames per second and 60 frames per second.

7. The system of claim 1, wherein the system is a night vision application for use in a vehicle.

8. The system of claim 1, further comprising a first Laplacian pyramid representation built from the log image and a second Laplacian pyramid representation built from the power image, wherein the fusion subsystem, further comprises a pyramid fusion of the first and second Laplacian pyramid transformations.

9. A system for creating an enhanced image from an initial image, comprising:
a computer, said computer providing for:
identifying a plurality of pixel values within the initial image;
performing a logarithm transform method and a power transform method on the initial image to create a plurality of interim images;
invoking a linear transform method on at least two of said interim images; and
fusing at least two of said interim images into the enhanced image.

10. The system of claim 9, wherein the linear transform method includes a plurality of potential pixel values from 0 through 255.

11. The system of claim 9, wherein said interim images are grayscale or color images.

12. The system of claim 9, wherein at least one interim image is influenced by said power transform method and is subsequently subjected to a threshold method before being fused into the enhanced image.

13. The system of claim 9, wherein at least one interim image is influenced by said power transform method and is subsequently subjected to a mask image refinement method before being fused into the enhanced image.

14. A method for enhancing an image, comprising:
identifying a plurality of pixel values in an initial image;
creating a first copy and a second copy of the plurality of pixel values;
performing a logarithm transform method on the first copy of pixel values to create a log image;
performing a power transform method on the second copy of pixel values to create a power image;
combine the power image and log image into the enhanced image.

15. The method of claim 14, wherein a fusion method selectively combines the power image and the log image into the enhanced image.

16. The method of claim 14, wherein a threshold method selectively influences the power image before it is combined into the enhanced image.

17. The method of claim 14, wherein a mask image refinement method selectively influences the power image before it is combined into the enhanced image.

18. The method of claim 14, wherein the logarithm transform method is influenced by a predefined plurality of numerical parameters.

19. The method of claim 14, wherein the power transform method is influenced by a predefined plurality of numerical parameters.

20. The method of claim 14, wherein the initial image is a view from a CMOS camera loaded on a vehicle.

21. The method of claim 14, wherein the enhanced image is created from the initial image in a substantially real-time manner.

22. An image enhancement system that is configured to create an enhanced image from an initial image, comprising:
a power transform subsystem, said power transform subsystem providing for a power transform method for creating a power image from the initial image;
a logarithm transform subsystem, said logarithm transform subsystem providing for a logarithm transform method for creating a log image from the initial image;
a first Laplacian pyramid representation built from the log image and a second Laplacian pyramid representation built from the power image; and
a pyramid fusion subsystem that fuses said first and second Laplacian pyramid transformations into an enhanced, pyramid fused image.

* * * * *